(12) United States Patent
Barker et al.

(10) Patent No.: US 6,447,252 B1
(45) Date of Patent: Sep. 10, 2002

(54) ROTOR-SHAFT CONNECTOR

(75) Inventors: Alan Barker; Stephen H Redfern, both of Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/553,290

(22) Filed: Apr. 20, 2000

(30) Foreign Application Priority Data

May 7, 1999 (GB) .............................................. 9910594

(51) Int. Cl.⁷ ................................................. F01D 5/02
(52) U.S. Cl. ............... 416/211; 416/204 A; 416/210 A; 416/213 R; 416/244 A
(58) Field of Search .......................... 416/244 R, 244 A, 416/204 R, 204 A, 210 R, 210 A, 211, 213 R, 213 A, 198 R, 198 A, 180, 197 C; 74/572

(56) References Cited

U.S. PATENT DOCUMENTS

| | | | | |
|---|---|---|---|---|
| 2,445,661 A | | 7/1948 | Constant | |
| 2,928,649 A | * | 3/1960 | Lombard et al. | 416/198 A |
| 3,323,710 A | * | 6/1967 | Daly | 416/244 R |
| 3,869,258 A | * | 3/1975 | Scott | 416/180 |
| 5,113,654 A | * | 5/1992 | Sahashi | 416/197 C |

FOREIGN PATENT DOCUMENTS

| | | | | |
|---|---|---|---|---|
| CA | 585775 A | * | 10/1959 | ............. 416/197 C |
| CH | 210879 A | * | 8/1940 | ............. 416/244 A |
| DE | 1264821 A | | 3/1968 | |
| GB | 2108243 A | | 5/1983 | |
| JP | 57-79359 A | * | 5/1982 | ................. 416/180 |

* cited by examiner

Primary Examiner—Christopher Verdier
(74) Attorney, Agent, or Firm—W. Warren Taltavull; Manelli Denison & Selter PLLC

(57) ABSTRACT

An annular connector for connecting a rotor and shaft, has an axial cross sectional profile which approximates a serpentine form. The shape defines only obtuse angles and curves, so that during rotation of the assembly, stress variations in the connector are reduced, as are stress peaks.

4 Claims, 1 Drawing Sheet

ROTOR-SHAFT CONNECTOR

FIELD OF THE INVENTION

Power generating means such as gas turbine engines, generate power by passing air through a compressor, burning some of the compressed air with fuel in a combustion chamber, and expelling the resulting gases to atmosphere via a turbine system. The operation becomes self sustaining, in that the turbine system drives shafting to which a rotor or rotors are connected, the or each of which has a plurality of compressor blades spaced about its rim in known manner, for the purpose of compressing the air which flows therethrough, to the combustion chamber.

BACKGROUND OF THE INVENTION

It is known, to connect a rotor to a shaft, via a drive arm consisting of an annular member, the axial cross sectional shape of which likens a hairpin, which is a term of art. However, such a shape as is described immediately hereinbefore, when absorbing the stresses imposed on the assembly of rotor and shafting during rotation, does so in a manner which results in a non uniform distribution of those stresses, which in turn, results in high value peak stress loads in local places. This adversely affects the life of the components of the assembly. Therefore, the present invention seeks to provide an improved rotor shaft connector.

SUMMARY OF THE INVENTION

According to the present invention, a rotor and shaft connector comprises an annular drive arm for interconnecting said rotor and said shaft, a radially outer portion of said drive arm being fixable to said rotor and a radially inner portion of said drive arm and being fixable to said shaft, so that said rotor and shaft are operationally maintained in radially spaced apart relationship, said drive arm including a portion that is so configured as to be semi-toroidal in configuration to define a radially outer rim of said drive arm that is fixable to said rotor, said drive arm additionally including a radially inner flange that is fixable to a corresponding flange provided on said shaft, the arrangement being such that variation in stress distribution throughout said drive arm is minimized with consequent reduction in the magnitude of stress peaks therein.

BRIEF DESCRIPTION OF THE DRAWING

The invention will now be described, by way of example, and with reference to FIGS. 1 to 3 of the accompanying drawings, wherein.

DETAILED DESCRIPTION OF THE INVENTION

Figure 1:
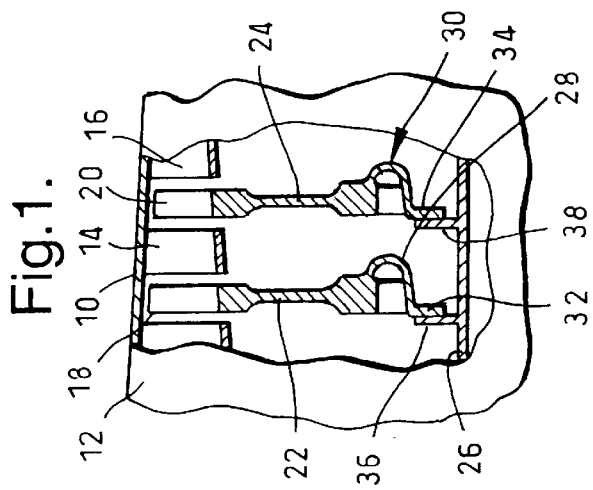
FIG. 1 is a diagrammatic axial cross sectional part view of a gas turbine engine rotor system incorporating the present invention.

Referring to FIG. 1, a gas turbine engine compressor casing 10 supports a plurality of stages of stator blades 12, 14 and 16, in known manner. Stages of rotor blades 18 and 20, are positioned in known manner, between adjacent stages of stator blades 12, 14, and 14 and 16. Rotor blades 18, 20 are carried on respective rotors 22 and 24.

Each rotor 22 and 24 is fastened to a common shaft 26, via respective drive arms 28 and 30 which, as depicted, are integrally formed with their respective rotors 22, 24 and respective annular flanges 32 and 34. The flanges 32 and 34 are fastened, by any suitable means such as bolts (not shown), to respective annular flanges 36 and 38, which are formed integrally with the rotor shaft 26.

Figure 2:
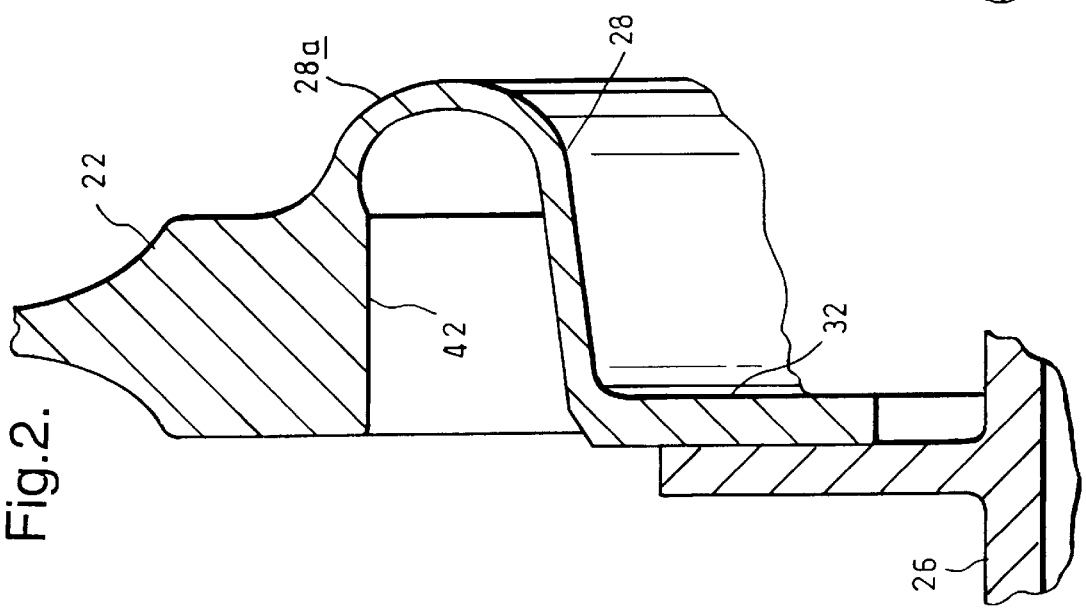
FIG. 2 is an enlarged part view of a rotor in FIG. 1.

Referring now to FIG. 2, in this example, which represents all of the rotors in the compressor casing 10, the drive arm 28 has a portion 28a which is turned radially outwardly of, and over the drive arm, to join a face of the rotor 22, adjacent the rim of a bore 42 which passes therethrough.

The shape of the curved portion 28a defines a part-elliptical cross-section, semi-toroid which, on operational rotation of the rotor 28 and the associated shaft 26, by virtue of its curvature, distributes the working stresses which the drive arm 28 experiences, substantially evenly throughout its length, from flange 32, to rotor 22. It follows, that local stress peaks of any significant magnitude are avoided.

Figure 3:
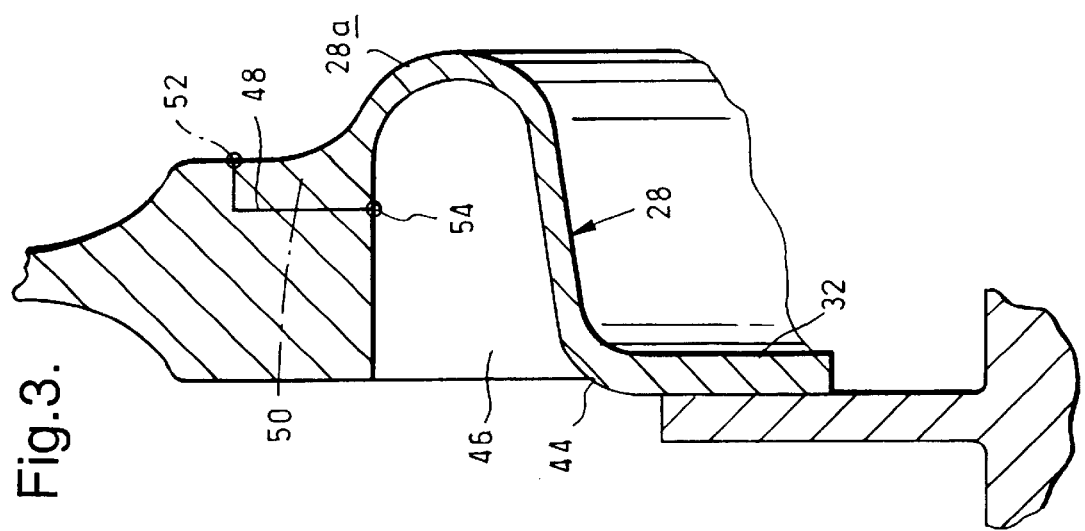
FIG. 3 depicts an alternative arrangement of the rotor in FIG. 2.
Figure 4:
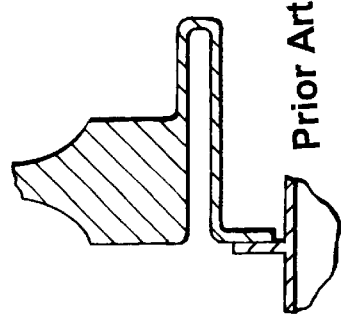
FIG. 4 is an example of prior art.

Referring now to FIG. 3, this example of the present invention differs from FIG. 2, firstly in that the semi-toroid 28a is truly part-circular in cross sectional profile, and the flange 32 joins the straight portion of drive arm 28 via a further curved portion 44. This form also distributes stress loads more evenly than hitherto, with consequent reduction of local stress peaks. In both cases, a longer component operating life is thus achievable, compared to the life which is achieved by the prior art component depicted in FIG. 4.

A further alternative form (not shown) of the present invention consists of curving that portion 46 of the drive arm 28, which joins the flange 32 and the semi-toroid. Such a curve would have a relatively large radius of curvature, so as to avoid having to reduce the magnitude of the radius of curvature of the semi-toroid, in order to achieve tangial blending of the two radii. Moreover, no part of the curved portion 46, if adopted, should dip below the maximum diameter of the flange 32, so as to avoid effectively forming an acute angle therebetween. In FIGS. 1 to 3, the portion 46 is frusto conical, and its small diameter end joins the flange 32 or 34 so that between them, the flanges 32 or 34 and portion 46 define an obtuse angle. As stated hereinbefore, the arrangement ensures a reduction in stress peaking areas, as the stresses move along the drive arms 28 and 30. It follows that, forming the curved portion portion 46 in the manner described hereinbefore, will provide an identical advantage.

A rotor and drive arm in accordance with the present invention, can be manufactured in a number of ways, as follows. Firstly, the whole can be produced as a forged blank. This is the preferred method. The blank is then profile turned so as to form the totally finished article. Such a method of production is well known. It does have a drawback, in that if an error is made during the turning operation, the whole is scrapped.

An alternative mode of manufacture, is to form the rotor and drive arm from separate pieces. Referring again to FIG. 3, the rotor 22 has been produced and machined, during which process, a recess 48 has been cut in the face of that side to which the associated drive arm 28 is connected for operation. The drive arm 30 has been produced separately, and has a further flange 50 formed thereon, which fits into the recess 48 in the rotor 24. When so fitted, the flange 50 and rotor 24 are welded together, about their external joint lines 52 and 54.

The rotor 24 and drive arm 28 could be bolted together, but such a fastening would create weight, windage and balance problems.

We claim:

1. A rotor and shaft connector wherein the rotor extends radially relative to said shaft and includes a radially inner end and a base located at said radially inner end, comprising an annular drive arm for interconnecting said rotor and said shaft, a radially outer portion of said drive arm being attached to said base of said rotor and a radially inner portion of said drive arm being attached to said shaft, so that said rotor and said shaft are operationally maintained in radially spaced apart relationship, said drive arm including a portion that is so configured as to be semi-toroidal in configuration between said base and said shaft to define a radially outer rim of said drive arm that is attached to said base of said rotor, said drive arm additionally including a radially inner flange that is attached to a corresponding flange provided on said shaft, the arrangement being such that variation in stress distribution throughout said drive arm is minimized with consequent reduction in the magnitude of stress peaks therein.

2. A rotor and shaft connector as claimed in claim 1, wherein said annular drive arm includes a portion of frusto-conical configuration.

3. A rotor and shaft connector as claimed in claim 2 wherein said drive arm includes another portion interconnecting said radially inner flange and said frusto-conical portion thereof, said another portion being curved.

4. A rotor and shaft connector as claimed in claim 1 wherein said drive arm is a separate component attached to said rotor by welding.

* * * * *